INVENTOR
LEO M. WALCH JR.

ATTORNEYS

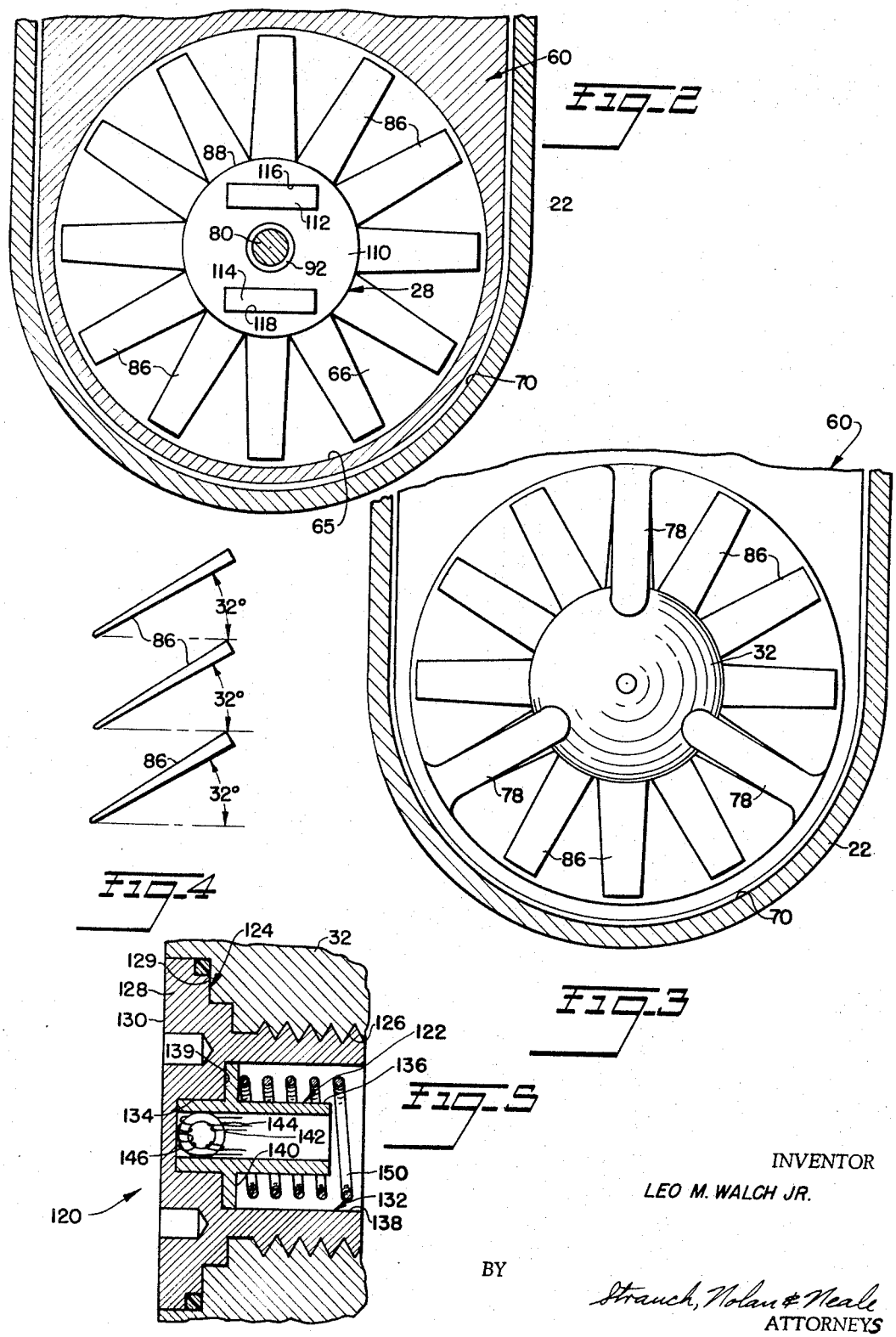

Sept. 19, 1967   L. M. WALCH, JR   3,342,070
FLUID METER
Filed Oct. 1, 1964   3 Sheets-Sheet 3

INVENTOR
LEO M. WALCH JR.
BY
Strauch, Nolan & Neale
ATTORNEYS

United States Patent Office 3,342,070
Patented Sept. 19, 1967

3,342,070
FLUID METER
Leo M. Walch, Jr., Pittsburgh, Pa., assignor to Rockwell Manufacturing Company, Pittsburgh, Pa., a corporation of Pennsylvania
Filed Oct. 1, 1964, Ser. No. 400,727
5 Claims. (Cl. 73—231)

The present invention relates to fluid flow meters and more particularly to an apparatus for producing an electrical signal which is representative of fluid flow rate.

This invention is especially useful for indicating the total volume or rate of volume flow through a turbine-type flow meter.

In the recent past, it has become the practice to detect rotation of a fluid metering rotor with an electrical signal generating pick-up unit or transducer and to apply the generated electrical signal produced by the pick-up unit to an electrically actuated totalizing register which may be located remotely from the meter site. One of the major shortcomings of conventional metering apparatus of this type having pick-up units constructed prior to this invention is that they have an extremely short service life. The components operated at such a rate that failure came comparatively early in the useful life of the meter as a whole. As a consequence, the accuracy of the meter is impaired.

In the meter of the present invention, one or more permanent magnets are mounted for rotation with the metering rotor in close proximity to a relatively fixed, ferrite pick-up core which forms a part of a novel pick-up unit. An exciting winding and a detecting winding are wound around the core. The exciting winding is energized by a high frequency, oscillator produced, alternating current which appears by induction in the detecting winding when the core is unsaturated. As each of the rotor rotated, permanent magnets move into close proximity with the core, the flux field of each magnet loops through the core and combines with the flux produced by the exciting winding to saturate the core with the result that the high frequency signal induced in the detecting winding is suppressed and goes to zero. By varying the reluctance in pick-up core in this manner, no moving parts such as magnetically actuated switch contacts which prematurely wear or burn out are needed to produce an output signal.

Accordingly, it is, in general, a major object of this invention to provide a novel fluid meter apparatus which measures flow of fluid with improved accuracy.

Another object of this invention is to provide a novel, compact, economical meter pick-up unit which produces an electrical signal for application to a remote counter.

A more specific object of this invention is to provide a novel fluid meter pick-up unit having a core which is saturable by a rotor rotated, permanent magnet to suppress an induced exciting signal when the magnet moves into close proximity of the core.

Still another more specific object of this invention is to provide a novel fluid meter, signal generating pick-up unit which is mounted in a special fluid guide core and rotor mounting construction in the meter housing.

Further objects of this invention will presently appear as the description proceeds in connection with the appended claims and the annexed drawings wherein:

FIGURE 2 is a section taken substantially along lines 2—2 of FIGURE 1;

FIGURE 3 is a section taken substantially along lines 3—3 of FIGURE 1;

FIGURE 4 is a development of a fragmentary cylindrical section at the tips of the blades of the turbine metering rotor shown in FIGURE 1; and FIGURE 5 is an enlarged fragmentary view of the meter pick-up unit illustrated in FIGURE 1;

Figure 1:
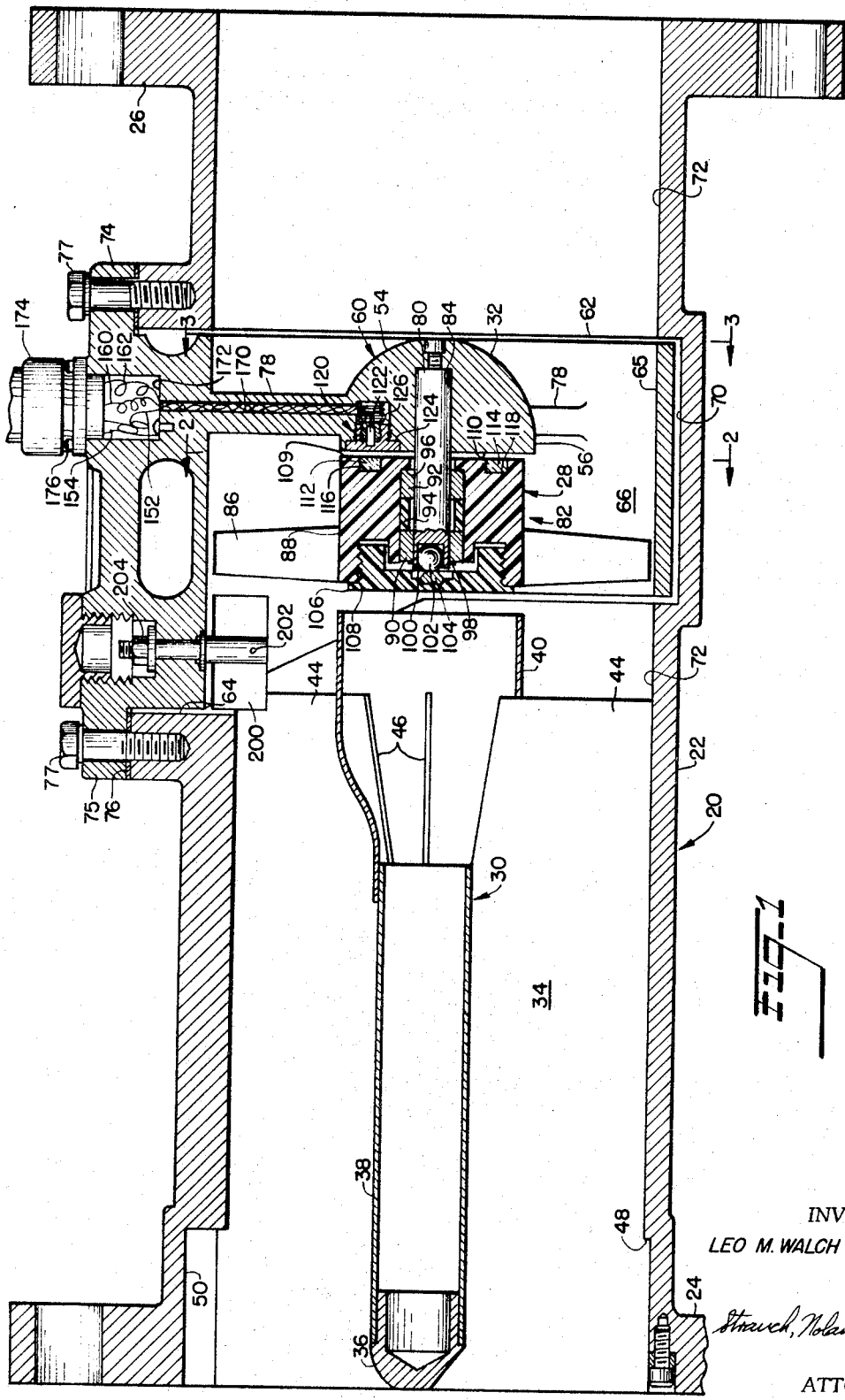
FIGURE 1 is a longitudinal section of an axial flow turbine meter assembly constructed according to a preferred embodiment of the present invention.

Referring now to the drawings and more particularly to FIGURE 1, the reference numeral 20 generally designates an axial flow turbine meter particularly adapted for use in metering liquids such as water and comprising a one piece housing 22 having an essentially tubular configuration and terminating at opposite ends in radially extending pipe attachment flanges 24 and 26. The internal diameter of housing 22 preferably is substantially equal to that of the conduit in which meter 20 is disposed for fluid flow measuring purposes.

With continued reference to FIGURE 1, a rotor assembly 28 is coaxially mounted within housing 22 axially between an upstream core 30 and a downstream core 32. Cores 30 and 32 are mutually coaxially aligned in housing 22 and cooperate with rotor assembly 28 to form an annular channel 34 between the inlet end of the meter at flange 24 and the outlet end of the meter at flange 26.

Core 30 is formed with an upstream bullet shaped nose section 36 which is coaxially received in and fixed to an intermediate tubular section 38 having a uniform external diameter. Nose section 36, which smoothly merges with section 38, has a suitable diverging cross section in the direction of fluid flow to convert the flow of fluid being metered from a cylindrical stream into an annular stream. At its downstream end, core 30 is provided with a bell shaped end section 40 snugly and coaxially receiving the downstream end of section 38. As shown, section 40 is formed with an enlarged diametered downstream end which smoothly merges with an upstream smaller diametered end. Section 38 is fixed to section 40 by any suitable means. A plurality of radial straightening vanes 44 extend into axial slots 46 formed in section 40 and are fixed to core 30 by any suitable means. Vanes 44 extend from a region intermediate the opposite ends of section 40 to the inlet end of meter 20 at flange 24 and support core 30 in housing 22. The upstream ends of vanes 44 are formed with radial extensions 48 which snugly seat in a counterbored recess 50 formed inwardly of the upstream end of housing 22.

With continued reference to FIGURE 1, core 32 is of solid, generally cylindrical configuration having a curved downstream nose portion 54 which merges with a uniformly diametered end section 56 facing upstream and disposed adjacent to rotor assembly 28.

Core 32, as shown in FIGURES 1 and 3, integrally forms a part of a one-piece insert member 60 having an annular body portion 62 which is received through a transverse, side opening 64 (FIGURE 1) formed in housing 22 between flanges 24 and 26. Body portion 62 is formed with an inwardly facing annular wall surface 65 concentrically surrounding core 32 to define an axial passage 66 which is open at both ends and which is circular in cross section. As shown, body portion 62 extends into an inwardly opening, generally U-shaped recess 70 formed in housing 22 and having a smooth, arcuate bottom wall radially outwardly offset from a uniformly diametered, internal housing wall surface 72 (FIGURE 1) delimiting channel 34. The internal housing diameter at wall surface 72 is the same as the diameter of passage 66 such that when body portion 62 is received in recess 70, wall surface 65 forms a continuation of wall surface 72 in the manner shown to provide for a smooth fluid guide surface between the inlet and outlet ends of the meter.

With continued reference to FIGURES 1 and 3, body portion 62 is formed integral with a cover plate portion 74 which extends over opening 64. Plate portion 74 is rimmed with an endless flange 75 which is seated on a flat annular surface 76 formed on housing 22 in surrounding relationship with opening 64. Cap screws 77 extending through flange 75 detachably secure member 60 to housing 22. Core 32 is integrally joined to body portion 62 by three equiangularly spaced apart radial arms 78.

Member 60 and housing 22 are made from non-magnetic material such as bronze. Core 30 and vanes 44 preferably are made from stainless steel and are axially spaced from rotor assembly 28 as shown.

As best shown in FIGURE 1, core 32 carries rotor assembly 28 which comprises a rotor mounting shaft 80 and a bladed rotor 82. Shaft 80 is coaxially fixed in a bore 84 formed in core 32 along an axis that is coaxial with the longitudinal axis of meter 20.

Rotor 82 is preferably made of suitable plastic such as polypropylene and comprises a series of straight blades 86 which extend radially across passage 66 and which are fixed at their inner ends to a cylindrical hub 88. Hub 88 is journalled on shaft 80 by axially spaced apart bearings 90 and 92 each comprising a bushing preferably made of graphite A spacer sleeve 94 of plastic retains bearing 90 and 92 in axially spaced apart relation.

As shown in FIGURE 1, bearing 92 seats against an annular shoulder 96 facing axially upstream and formed in hub 88. The assembly of bearings 90 and 92 and spacer 94 are axially retained in place within hub 88 by a groove seated snap ring 98 carried by the upstream end of shaft 80 which projects slightly axially beyond a recessed portion of hub 88. An axially forwardly opening recess 100 formed in the upstream end of shaft 80 receives a thrust bearing comprising a ball 102 which bears against a carbide thrust plate 104. Thrust plate 104 is mounted in a removable plug 106 which is threadedly secured in a tapped counterbored recess 108 formed in hub 88 and axially opening toward the upstream end of meter 20.

With continued reference to FIGURE 1, hub 88 is located at opposite ends closely adjacent to core 32 and to section 40 of core 30, and the diameter of hub 88 is equal to the diameter of core section 56 and to the adjacent end of section 40 to form a smooth, uniformly diametered, substantially uninterrupted inner boundary delimiting channel 34. Each of the blades 86 is provided with a uniform, radially outwardly extending taper with the result that the root of each blade immediately adjacent hub 88 is of greater length than the tip of the blade adjacent the wall surface 65. Blades 86, as best shown in FIGURE 4, are turned such that they make a 32-degree angle of attack with the longitudinal axis of meter housing 22. The tapered shape of blades 86 together with the 32-degree angle of attack has been found, according to this invention, to provide for improved metering accuracy. Flow of fluid through channel 34 imparts rotation to rotor 82 in the usual manner.

With continuing reference to FIGURE 1, hub 88 and core 32 are provided with opposed, axially directed, smooth, flat end faces 109 and 110 which are contained in closely adjacent parallel spaced apart planes extending at right angles to the longitudinal axis of meter 20. A pair of permanent, axially polarized, ceramic bar magnets 112 and 114, as shown in FIGURES 1 and 2, are respectively snugly seated in diametrically opposed, rectangular recesses 116 and 118 which are formed in hub 88 and which open axially toward end face 110 of core 32. Magnets 112 and 114 as best shown in FIGURE 2, are flush with end face 109 and are fixed in recesses 116 and 118 to rotate with rotor 82. The longitudinal polarization axes to magnets 112 and 114 are parallel and are at right angles to a diametral line passing perpendicularly through the longitudinal axis of meter 20. Magnets 112 and 114 cooperate with a pick-up unit 120 carried by core 32 to generate electrical signals representative of the rotor velocity.

As best shown in FIGURE 5, pick-up unit 120 comprises a core and transformer assembly 122 which is carried by an externally threaded plug 124. Plug 124 is threadedly received in a tapped blind bore 126 formed in core 32 and extending inwardly from end face 110 along an axis parallel to but laterally offset from the longitudinal axis of bore 84.

The radial distance of bore 126 from the longitudinal axis of meter 20 is the same as the radius of the circular paths in which magnets 112 and 114 rotate.

An enlarged end plate section 128 forming an integral part of plug 124 is seated in a counterbored recess 129 formed in core 32 coaxially with bore 126 to close bore 126. Section 128 is provided with a smooth flat outer surface 130 which faces hub 88 and which is flush with surface 110 of core 32 as shown.

With continuing reference to FIGURE 5, plug 124 is formed with a stepped, internal blind bore 132 formed inwardly of the inner end of plug 124 received in bore 126. As shown, bore 132 terminates in a reduced diameter bore section 134 which snugly and coaxially receives a rigid tubular transformer shell 136 forming a part of assembly 122. Bore section 134 terminates at its inner end in a flat bottom closely adjacent to end face 130. The wall thickness between the flat bottom of bore section 134 and surface 130 is very thin and for a six inch meter is preferably 0.30 to 0.31 inch.

With continuing reference to FIGURE 5, stepped bore 132 is provided with an enlarged bore section 138 at the inner end of plug 124. Bore section 138 cooperates with bore section 134 to define an annular shoulder 139 against which a radial flange 140 is seated. Flange 140 is formed integral with shell 136 intermediate its opposite ends. Shell 136 extends axially into bore section 138 and receives a small, toroidal ferrite core 142. Shell 136 is potted with epoxy to fix core 142 in a position where its longitudinal axis normally intersects the longitudinal axis of shell 136 and is contained in a plane that is in parallel spaced apart relation to a plane containing end face 110 By so positioning core 142 with respect to magnets 112 and 114, the flux field produced by magnets 112 and 114 will periodically saturate core 142 as rotor 82 is rotated for a purpose to be explained later on. The material forming core 142 is magnetically soft and has a high permeability to provide an excellent flux path for the flux fields established by magnets 112 and 114 without experiencing any residual magnetic properties when the flux fields produced by magnets 112 and 114 are removed.

Around core 142 are wound several turns of wire to form an exciting winding 144 within shell 136. In this embodiment, five turns of No. 40 wire are used to form winding 144. A secondary, detector winding 146 is also wound around core 142 as shown. Eighteen turns of No. 40 wire preferably are used to form winding 146 in the meter construction described herein.

Still referring to FIGURE 5, a coiled compression spring 150 surrounding the rearward end of shell 136 reacts against the bottom of bore 126 to resiliently urge flange 140 into abutment with shoulder 139 and thus retain shell 136 in place. With this pick-up unit construction, it will be appreciated that shell 136 together with core 142 and windings 144 and 146 are easily removable as a unit simply by unscrewing plug 124.

Figure 6:
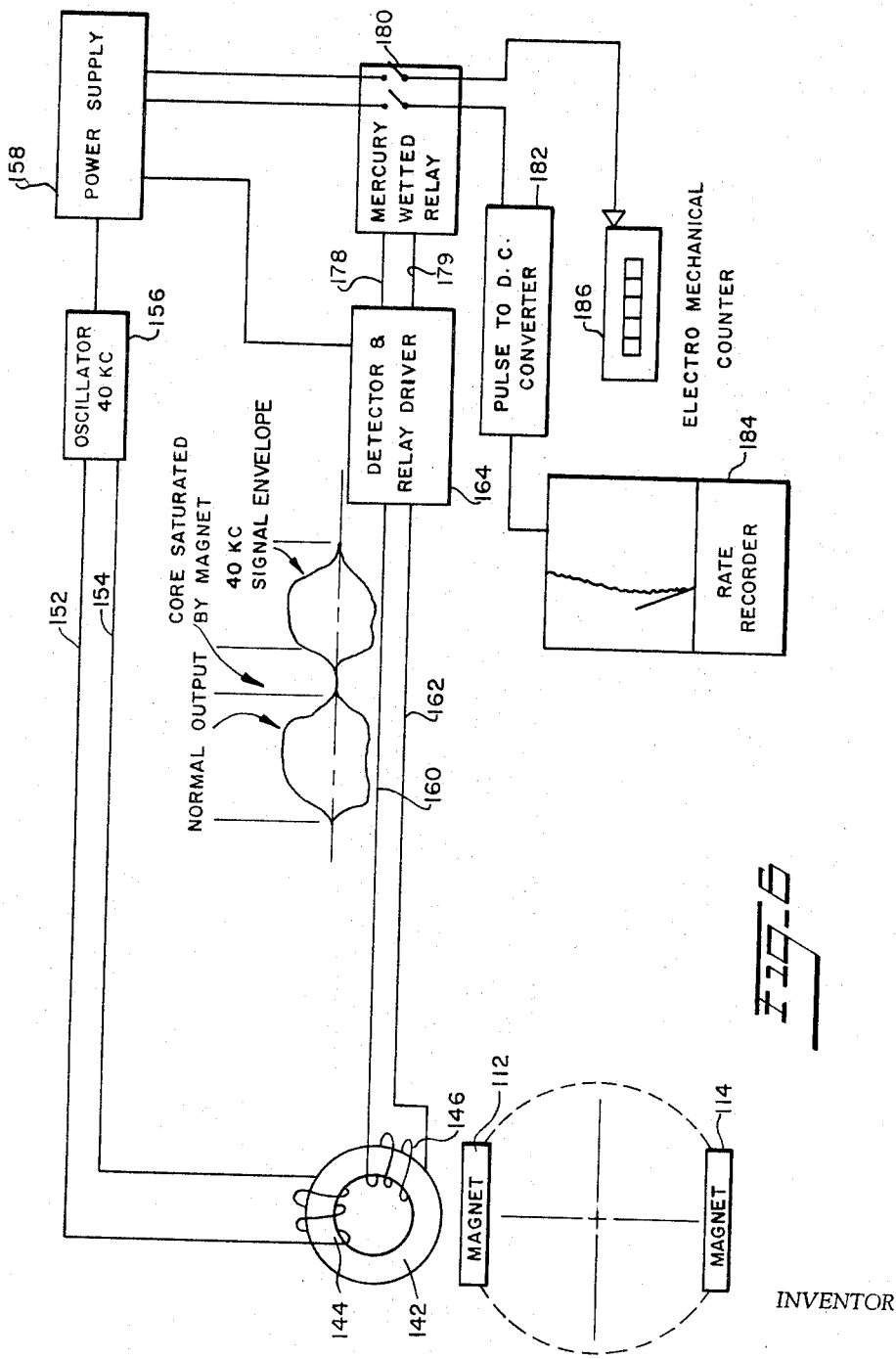
FIGURE 6 is a read-out circuit diagram for the pickup unit illustrated in FIGURE 1.

Referring now to FIGURE 6, a typical electronic read-out circuit is illustrated and comprises a high frequency oscillator circuit 156 having a power source 158. Oscillator circuit 156 is connected by conductors 152 and 154 to the terminals of winding 144 to energize winding 144 with a high frequency current which, according to this embodiment, is preferably 40 kc. The terminals of winding 146 are connected by a pair of conductors 160 and 162 to a signal detector and relay drive circuit 164 of suitable form.

As shown in FIGURE 1, conductors 152, 154, 160, and 162 extend through a bore 170 formed longitudinally in one of the arms 78. Conductors 152, 154, 160, and 162 pass through an outwardly opening recess 172 in plate portion 74 and into a cannon connector 174 mounted over recess 172 and detachably fixed to plate portion 74 by cap screws 176.

Referring back to FIGURE 6, detector and relay drive circuit 164 is connected by conductors 178 and 179 to a suitable mercury wetted relay 180 which receives power from source 158. Relay 180 may be conveniently connected through a pulse to D.C. converter 182 to a flow rate recorder 184, or to an electrically actuated counter 186, or to both recorder 184 and counter 186 as shown.

In operation of the readout circuit and pick-up unit construction just described, the high frequency pulses produced by oscillator circuit 156 are fed through conductors 152 and 154 to energize winding 144. When magnets 112 and 114 are located remotely from core 142, the high frequency signal in winding 144 is induced in winding 146. As rotor 82 is rotated in response to flow of fluid through housing 22, magnets 112 and 114 periodically move into close proximity with core 142 with the result that the flux field of each of the magnets 112 and 114 loops through code 142 and combines with the circulating flux produced in core 142 by the high frequency exiciting current used to energize winding 144.

Owing to the position of core 142 relative to magnets 112 and 114 and to the large amount of flux lines of each of the magnets 112 and 114, the flux field of each magnet combines with the circulating exciting current produced flux to substantially saturate core 142. As a consequence, the high frequency exciting signal appearing on winding 144 by induction is suppressed and substantially disappears or goes to zero as each of the magnets 112 and 114 is rotated into close proximity with core 142. Thus, it is clear that the induced, high frequency exciting voltage appearing at the terminals of winding 146 is periodically suppressed as each of the magnets 112 and 114 is rotated into the vicinity of core 142 with the result that a digital type signal composed of a series of pulses representative of the number of turns made by rotor 82 appears on conductors 160 and 162.

The presence or absence of the high frequency exciting signal on winding 146 is sensed by the detector portion of circuit 164, and the envelope of this signal, which is essentially a square wave, actuates relay 180 through the driver portion of circuit 164. The opening and closing of relay 180 in the usual manner produces pulses from the voltage provided by source 158. The relay produced pulse representing the number of turns made by rotor 82 are fed to counter 186 and/or recorder 184 to provide a read-out of the total volume of fluid flow or the volumertic rate of fluid flow.

In contrast with conventional systems in which a read-out circuit switch is activated by a rotor-rotated magnet, the digital signals produced by the pick-up unit and the read-out circuit of this invention are not subject to inaccuracies attributable to variations in the fluid flow rate and/or low fluid flow rates. In the conventional systems mentioned above, the magnetically actuated switch is employed to complete a circuit for energizing or actuating a counter. This involves physical movement in the magnetic switch located inside the meter body. In the preferred embodiment of the meter of the present invention, the rotor makes one revolution for each two gallons of fluid being metered. At a flow of 2000 gallons per minute the sensing unit must deliver over 33 pulses per second. It can be seen that this pulse frequency would cause considerable wear, leading to early failure of the conventional systems. There are no moving parts associated with core 142 to burn out or wear out. Core 142 becomes saturated as each of the magnets 112 and 114 rotates into contiguity to suppress the exciting signal and thereby produce a digital signal which accurately represents revolutions made by rotor 82. This absence of wear of the sensing instrument inside the meter produces far greater reliability in the system.

Another vital consideration leading to the present invention is the relative size of the components, compared to the prior systems. In the present invention the core 142 has an external diameter preferably on the order of .062 inch. This is potted in epoxy in a shell 136. This shell is made with a through bore with a diameter of .116 inch. The present invention thus utilizes components especially suitable for insertion in the structure of a meter without undue enlargement of this structure.

Counter 186 and/or recorder 184 may be located remotely from the site of meter 20 if desired. Usually, if the location of counter 186 or recorder 184 is greater than 100 feet, a line amplifier is employed to amplify the modulated signal produced by pick-up unit 120.

Results of tests show that the meter of this invention has a metering accuracy of better than ±1½ percent throughout an operating range of 20 to 2000 gallons per minute.

A calibrating vane 200 is shown in FIGURE 1 to be fixed on a shaft 202 upstream from and adjacent the tips of blades 86. Shaft 202 is rotatably mounted on cover plate portion 74 and is releasably secured in place by a nut 204. The axis of shaft 202 normally intersects the rotational axis of rotor 82. Vane 200 is factory adjusted and is fixed in adjusted position by tightening nut 204.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a fluid meter, a housing having inlet and outlet openings, a rotor rotatably supported in said housing to be driven by fluid flow therethrough, and means for producing an electrical signal representative of the rotor velocity comprising a fixed non-permanently magnetizable toroidal core having a longitudinal axis of resolution normally intersected by a plane containing the rotor rotational axis, a detecting winding wound around said core, a current energized exciting winding wound around said core for inducing a voltage signal in said detecting winding, and at least one permanent magnet carried by said rotor for rotation in a circular path coaxially surrounding the rotor rotational axis, said magnet being axially polarized along an axis that (a) is normally intersected by a plane containing the rotor rotational axis and (b) is contained in a plane extending parallel to the longitudinal axis of said core for periodically suppressing said voltage signal by substantially saturating said core with flux.

2. The fluid meter defined in claim 1 comprising a power source for energizing said exciting winding with a high frequency, alternating current.

3. The fluid meter defined in claim 1 comprising a hub forming a part of said rotor, a fluid guide core member disposed in said housing and having an end face spaced axially from and exposed to said hub, a recess formed in said hub and opening axially toward said end face for receiving said magnet to expose a face of said magnet to said end face, and means mounting said toroidal core in said fluid guide core member in close proximity to the path in which said magnet is rotated.

4. The fluid meter defined in claim 3 wherein said means mounting said toroidal core comprises a blind bore formed in said fluid guide core member, said blind bore opening toward said hub and extending along an axis paralleling but radially offset from the rotor rotational axis, a plug detachably secured in said bore and covering the open end thereof, a stepped bore formed in said plug and opening into said bore, a tubular part receiving said toroidal core and coaxially extending into a reduced diametered section of said stepped bore, said tubular part having a radially outwardly extending flange bearing against an internal shoulder formed in said stepped bore between said reduced diametered section and an enlarged diametered section of said stepped bore, and a spring disposed in said blind bore and reacting against the bottom of said blind bore to resiliently urge said flange into seating engagement with said shoulder.

5. The fluid meter defined in claim 1 wherein a second permanent magnet is carried by said rotor diametrically opposite from said one permanent magnet, said second permanent magnet being axially polarized along an axis extending parallel to the polarization axis of said one magnet and being contained in a plane normally intersecting the rotor rotational axis and containing the polarization axis of said one magnet.

References Cited

UNITED STATES PATENTS

| | | | |
|---|---|---|---|
| 2,709,366 | 5/1955 | Potter | 73—231 |
| 2,728,893 | 12/1955 | Bartelink | 73—231 X |
| 2,740,110 | 3/1956 | Trimble | 340—364 |
| 2,770,131 | 11/1956 | Sparling | 73—231 |
| 2,800,022 | 7/1957 | Granberg | 73—231 |
| 2,907,991 | 10/1959 | Van Allen. | |
| 3,005,158 | 10/1961 | Spinrad. | |
| 3,084,545 | 4/1963 | Waugh | 73—231 |
| 3,101,615 | 8/1963 | Pavone | 73—231 |
| 3,140,606 | 7/1964 | Kramer et al. | 73—205 |
| 3,169,398 | 2/1965 | Sparling et al. | 73—231 |

FOREIGN PATENTS 511,326  1/1955  Italy.

JAMES J. GILL, *Acting Primary Examiner.*

R. C. QUEISSER, *Examiner.*

E. D. GILHOOLY, *Assistant Examiner.*